United States Patent [19]

Siegrist

[11] Patent Number: 5,104,190
[45] Date of Patent: Apr. 14, 1992

[54] BUSHING FOR REDUCING LATERAL LOOSENESS IN A PIVOT SYSTEM

[75] Inventor: Ronald R. Siegrist, Grass Lake, Mich.

[73] Assignee: Hoover Universal, Inc., Plymouth, Mich.

[21] Appl. No.: 742,906

[22] Filed: Aug. 9, 1991

[51] Int. Cl.$^5$ .............................................. B60N 2/02
[52] U.S. Cl. .................................. 297/362; 297/354; 403/225
[58] Field of Search ............... 297/362, 354; 403/225, 403/226, 158; 16/2, 247, 273

[56] References Cited

U.S. PATENT DOCUMENTS

| | | | |
|---|---|---|---|
| 2,728,593 | 12/1955 | Hutton | 403/225 X |
| 2,771,312 | 11/1956 | Thiry | 403/224 X |
| 4,619,544 | 10/1986 | Laidely | 403/225 X |
| 4,657,303 | 4/1987 | Croft | 297/362 |
| 4,883,319 | 11/1989 | Scott | 297/354 |
| 4,943,116 | 7/1990 | Ohwada et al. | 297/362 |

Primary Examiner—Laurie K. Cranmer
Attorney, Agent, or Firm—Harness, Dickey & Pierce

[57] ABSTRACT

A bushing is disclosed for use in a pivot system to eliminate lateral looseness of a pivoting member mounted between a pair of support plates. The bushing is placed between one support plate and the pivoting member in an interference fit relationship to provide a retaining force on the pivoting member to hold it laterally in place. By using a compressible nylon of for the bushing having high lubricity, excessive wear of the bushing is eliminated and binding of the pivot system during operation is precluded. The bushing through passage is formed with an enlarged portion at the bushing ends to provide an annular space between the bushing and a pivot pin for compression of the bushing ends.

5 Claims, 2 Drawing Sheets

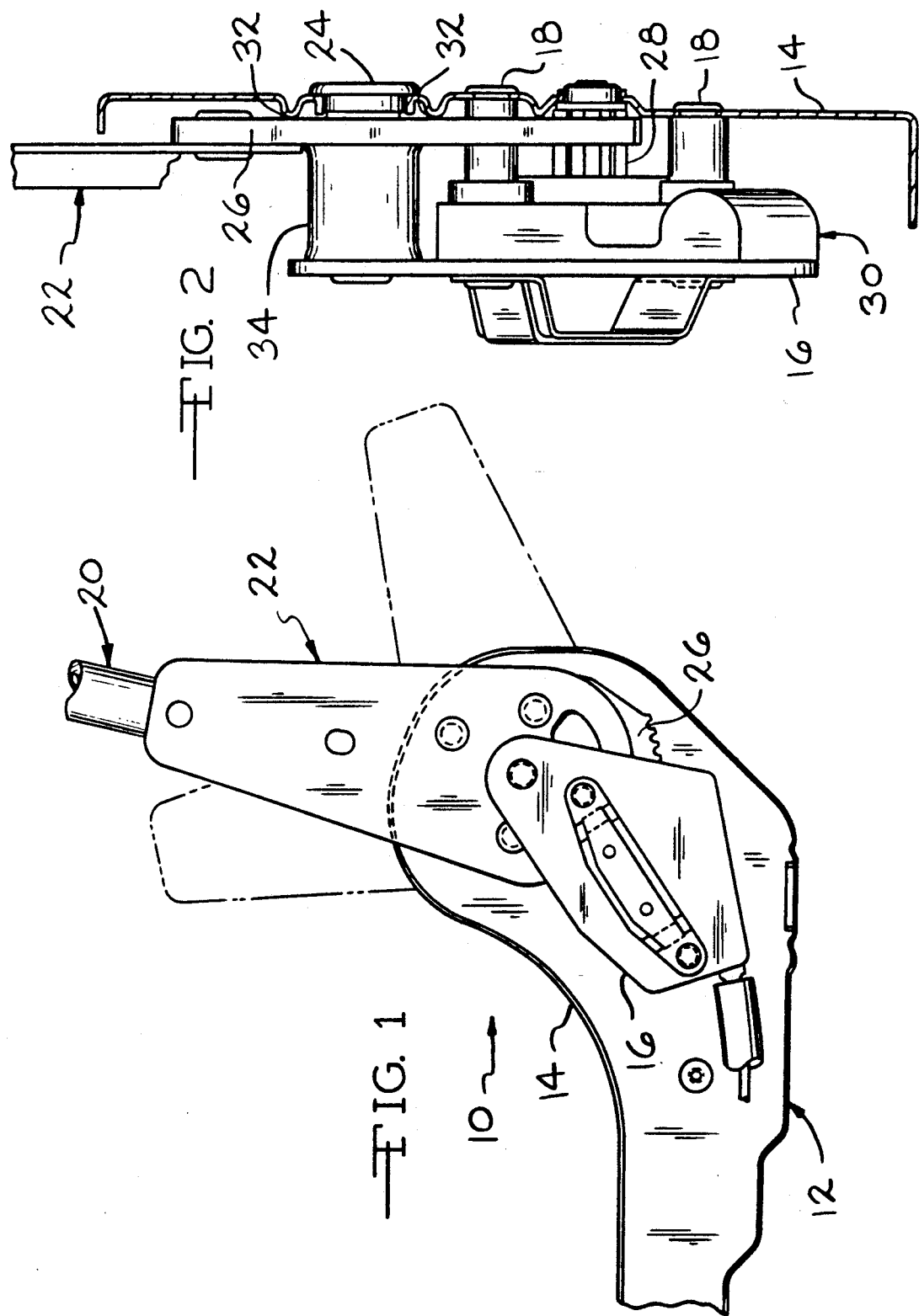

BUSHING FOR REDUCING LATERAL LOOSENESS IN A PIVOT SYSTEM

BACKGROUND AND SUMMARY OF THE INVENTION

The present invention relates to a bushing for reducing lateral looseness in a pivot system and in particular for use in a seat assembly in which a seat back is pivotally mounted to a lower seat cushion where the bushing is used to reduce lateral looseness of the seat back relative to the seat cushion.

Many seat assemblies, particularly automobile seat assemblies, are equipped with a reclining seat back that is pivotally mounted to a lower seat cushion. In a typical seat assembly structure, the seat cushion frame on both lateral sides of the seat cushion includes a pair of spaced plate members with the seat back frame having a downwardly extending plate member positioned between the two plates on both sides of the seat assembly. A pin carried by the spaced plate members of the seat cushion frame forms a pivot about which the seat back frame is rotated.

In many seat assemblies, a bushing is placed on the pivot pin between the back frame and one plate of the cushion frame to hold the seat back frame against the opposing plate of the seat cushion frame. These bushings are either made of metal or plastic and provide a small clearance between the bushing and the frame members to enable proper operation of the seat back recliner without binding. However, this small clearance allows for lateral movement of the back frame relative to the seat cushion frame The looseness from this clearance can result in both seat back shake as well as a feeling of instability during a vehicle cornering operation.

Accordingly, it is an object of the present invention to provide a bushing for a pivot system that reduces this lateral looseness.

It is a feature of the present invention to provide a bushing made from a cylindrical nylon body which has an interference fit between the back frame and the cushion frame. The lubricity of the nylon plus the compressibility of the nylon allows the bushing to be used in an interference fit while not exhibiting either excessive wear or binding in operation of the seat back recliner.

It is a further feature of the present invention to enlarge the diameter of the bushing through passage at the ends of the bushing to form an annular space between the bushing and the pivot pin at the bushing ends.

Further objects, features and advantages of the invention will become apparent from a consideration of the following description and the appended claims when taken in connection wit the accompanying drawings.

BRIEF DESCRIPTION OF THE DRAWINGS

FIG. 1 is a fragmentary side elevational view of a seat cushion and seat back frame at the pivot pin;

FIG. 2 is a rear elevational view of the cushion and back frame shown in FIG. 1 illustrating the bushing of the present invention;

DETAILED DESCRIPTION OF THE INVENTION

Figure 3:
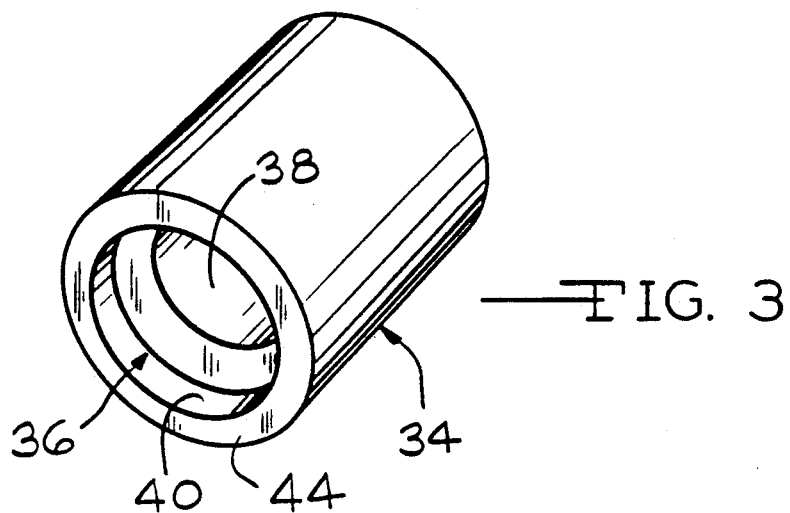
FIG. 3 is a perspective view of the bushing of the present invention.

The seat frame structure shown in FIG. 1 forms a recliner 10 which includes the bushing of the present invention for reducing lateral looseness in the recliner pivot mechanism. The recliner 10 is a part of a seat assembly which includes a lower seat cushion frame 12. Seat cushion frame 12 is formed in part by a riser plate 14 and a cover plate 16. The cover plate 16 is secured to the riser plate 14 by a pair of rivets 18 to provide a rigid frame structure. The plates 14 and 16 are generally parallel to one another and are spaced apart from one another. The seat back frame 20 includes a mounting plate 22 that is rotatably carried on the seat cushion frame 12 by a pivot pin 24 fixed to the plates 14 and 16. Frame 20 is pivotable between the two phantom line positions shown in FIG. 1.

The mounting plate 22 is attached to a lower sector gear 26 whose teeth engage a pinion gear 28 of the recliner transmission assembly 30 shown in FIG. 2. The recliner transmission assembly 30 is part of a typical power seat adjuster driven by an electric motor (not shown). However, it is to be understood that the bushing of the present invention can be incorporated into a seat recliner mechanism that is manually operated as well.

The mounting plate 22 is positioned laterally on the pivot pin 24 next to the riser plate 14. The riser plate has been formed with an annular rib 32 about the pivot pin 24 to provide circular line contact between the mounting plate 22 and the riser plate 14. In order to hold the mounting plate in contact with the rib 32, a bushing 34 is placed over the pivot pin between the mounting plate 22 and the cover plate 16.

The bushing 34 of the present invention is slightly longer than the space between the two plates 16 and 22 such that an interference fit is created. To accommodate the interference fit, the bushing 34 is made of a compressible plastic material. Preferably the bushing is made of a nylon having sufficient lubricity, i.e. a low coefficient of friction, to prevent excessive wear of the bushing or binding during operation of the recliner. The interference fit allows the bushing to force the mounting plate 22 firmly against the riser plate 14 to avoid any lateral movement of the riser plate along the pivot pin 24. Seat back shake and instability during cornering operations is thus prevented. The amount or degree of the interference is dependent upon the required axial force to hold the mounting plate 22 in place and the friction that can be accepted without binding of the recliner. An interference fit created by oversizing the bushing by approximately eight percent has been found to produce satisfactory results.

Figure 4:
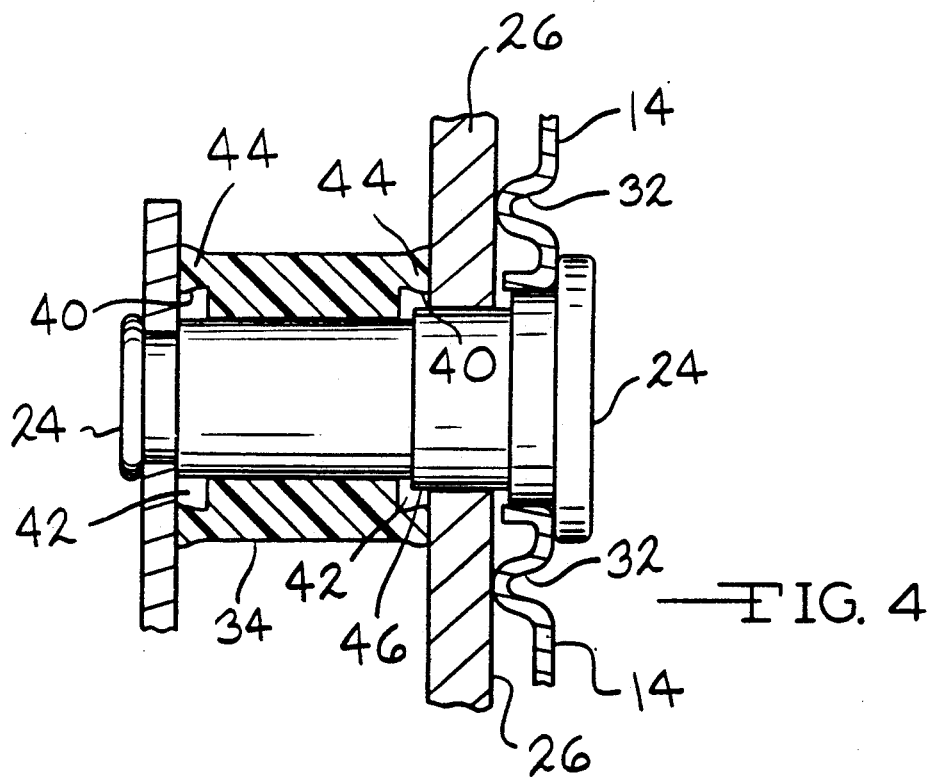
FIG. 4 an enlarged sectional view of the bushing in an assembled relation with the seat cushion and seat back frames.

The bushing 34 is formed with a through passage 36 for insertion of the pivot pin 24 therethrough. The passage 36 includes a central portion 38 that is sized to fit on the pivot pin 24. At each end of the bushing, the passage 36 includes a terminal portion 40 that is of a larger diameter than the central portion of the passage 36. When installed, the larger diameter terminal portion results in an annular space 42 between the pivot pin 24 and the bushing end portions 44. When the bushing is compressed due to the interference fit, the end portions 44 of the bushings can deform into the annular space 42 as shown in FIG. 4. The annular space 42 also provides a clearance for the shoulder 46 of the pivot pin upon which the mounting plate is supported. This clearance is necessary since the bushing 18 is in contact with the mounting plate.

While the bushing would function properly with an enlarged terminal portion 40 at only one end of the bushing, it is preferred to enlarge the through passage at both ends. This increases the compressibility to the bushing since both bushing ends are formed with less material and enables the bushing to accommodate larger range of assembly tolerance stack-ups without binding. The bushing can also be installed without reference to orientation since both ends of the bushing will provide clearance for the pivot pin shoulder 46.

The bushing of the present invention can be used in pivot systems other than in a seat back recliner where a pivoting member is carried by two spaced plates and it is desired to limit the lateral looseness of the pivoting member. The bushing of the present invention eliminates looseness by providing an interference fit to hold the pivoting member in position laterally. The lubricity of nylon prohibits excessive wear of the bushing and binding during operation of the pivot mechanism. In addition, the shape of the through passage in the bushing provides space for compression of the end portions of the bushing.

It is to be understood that the invention is not limited to the exact construction illustrated and described above, but that various changes and modifications may be made without departing from the spirit and scope of the invention as defined in the following claim.

I claim:

1. Seat assembly comprising:

lower frame having first and second spaced parallel plates;

an upper frame rotatably mounted to said lower frame by a pivot pin fixed to said first and second plates, said upper frame including a third plate disposed between said first and second plates and generally parallel thereto with said pivot pin extending through said third plate, said third plate being axially spaced from said second plate a predetermined distance; and a tubular bushing surrounding said pin and positioned between said third plate and said second plate, said bushing having an axial length greater than said predetermined distance between said second and third plates whereby an interference fit is formed and said bushing being made of a compressible material whereby said bushing applies a separating force on said second and third plates in the direction of the axis of said pivot pin.

2. The seat assembly of claim 1 wherein said bushing is made of nylon and is compressed to fit between said second and third plates.

3. The seat assembly of claim 1 wherein said bushing is axially oversized by approximately eight percent to provide the interference fit.

4. The seat assembly of claim 1 wherein said bushing has a through passage with a central portion of a first diameter and a terminal portion at one end having a second diameter larger than the first diameter to provide a radial space between the pivot pin and the bushing at said one end of said bushing.

5. The seat assembly of claim 1 wherein said bushing has a through passage with a central portion of a first diameter and a terminal portion at each end having a second diameter larger than the first diameter to provide a radial space between the pivot pin and the bushing at both ends of said bushing.

* * * * *